(12) United States Patent
Drantch et al.

(10) Patent No.: US 6,592,925 B2
(45) Date of Patent: Jul. 15, 2003

(54) DOUGH ESPECIALLY FOR BAKED GOODS AND METHOD FOR MAKING

(75) Inventors: Cynthia Y Drantch, Shorewood, MN (US); Linda R Kreisman, St. Paul, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 10/224,863

(22) Filed: Aug. 20, 2002

(65) Prior Publication Data

US 2003/0003213 A1 Jan. 2, 2003

Related U.S. Application Data

(63) Continuation of application No. 09/639,016, filed on Aug. 15, 2000, now Pat. No. 6,551,640.

(51) Int. Cl.[7] ............................................. A21D 10/02
(52) U.S. Cl. ........................ 426/549; 426/128; 426/319; 426/607
(58) Field of Search .......................... 426/549, 128, 426/607, 319

(56) References Cited

U.S. PATENT DOCUMENTS

| | | |
|---|---|---|
| 1,988,091 A | 1/1935 | Schumacher et al. |
| 2,870,022 A | 1/1959 | Anderson et al. |
| 3,582,353 A | 6/1971 | Fehr et al. ................. 99/86 |
| 3,879,563 A | 4/1975 | Tucker ..................... 426/128 |
| 3,970,763 A | 7/1976 | Moran et al. ............... 426/324 |
| 4,022,917 A | 5/1977 | Selenke .................... 426/331 |
| 4,209,547 A | 6/1980 | Scarpiello et al. |
| 4,234,618 A | 11/1980 | Jasko et al. |
| 4,326,052 A | 4/1982 | Kang et al. ................. 536/1 |
| 4,326,053 A | 4/1982 | Kang et al. ................. 536/1 |
| 4,410,557 A | 10/1983 | Miller |
| 4,707,365 A | * 11/1987 | Haynes et al. ............. 426/306 |
| 4,722,849 A | 2/1988 | Dartey et al. |
| 4,732,767 A | * 3/1988 | Seiden et al. ............. 426/549 |
| 4,792,456 A | 12/1988 | Katz et al. ............... 426/551 |
| 4,873,098 A | 10/1989 | Banks |
| 4,894,246 A | 1/1990 | Dartey et al. |
| 4,910,029 A | 3/1990 | Thulin et al. |
| 4,911,939 A | 3/1990 | Lou et al. |
| 4,940,595 A | 7/1990 | Yasosky et al. ............ 426/243 |
| 5,023,099 A | 6/1991 | Boehm |
| 5,080,920 A | * 1/1992 | Taylor et al. ............. 426/275 |
| 5,209,879 A | 5/1993 | Redding, Jr. ................ 264/23 |
| 5,258,197 A | 11/1993 | Wheeler et al. |

(List continued on next page.)

FOREIGN PATENT DOCUMENTS

| | | | |
|---|---|---|---|
| EP | 0163496 | * 12/1985 | |
| EP | 0868850 | 10/1998 | .......... A21D/10/00 |
| GB | 2108150 | 5/1983 | .......... C12N/1/16 |
| WO | WO-99/04640 | 2/1999 | .......... A21D/10/00 |

OTHER PUBLICATIONS

"Cooking Light", 39.
"Cookwise, The Hows and Whys of Successful Cooking", 130–133.
"Food ingredient Catalog", 1998, Archer Daniels Midland Co., 28–34, 40 and 41.
"Joy of Cooking", 635.
"Margarines and Shortenings", *Lipid in Foods Chemistry, Biochemistry and Technology,* Pergamon Press, Oxford, ISBN 0–08–025499–3,(1983),pp. 147 and 154.
"Part 163", Apr. 1, 2982.

*Primary Examiner*—Carolyn Paden
(74) *Attorney, Agent, or Firm*—Annette M. Frawley; John A. O'Toole; Janal M. Kalis

(57) ABSTRACT

The present invention comprises a dough. The dough comprises a fat selected from a group consisting of one or more of a single fractionated fat, a double fractionated fat, cocoa butter or mixtures of a single fractionated fat, a double fractionated fat and cocoa butter.

25 Claims, 1 Drawing Sheet

U.S. PATENT DOCUMENTS

| | | | |
|---|---|---|---|
| 5,374,440 A | * 12/1994 | Chedid et al. | 426/549 |
| 5,378,490 A | 1/1995 | Wheeler et al. | |
| 5,411,756 A | 5/1995 | Wheeler et al. | |
| 5,456,939 A | 10/1995 | Wheeler et al. | |
| 5,460,756 A | 10/1995 | Redding, Jr. | 264/4 |
| 5,547,698 A | * 8/1996 | Lansbergen et al. | 426/602 |
| 5,552,174 A | 9/1996 | Wheeler et al. | |
| 5,565,232 A | 10/1996 | Wheeler et al. | |
| 5,589,194 A | 12/1996 | Tsuei et al. | 424/497 |
| 5,662,953 A | 9/1997 | Wheeler et al. | 426/2 |
| 5,718,938 A | * 2/1998 | Cain et al. | 426/549 |
| 5,858,445 A | * 1/1999 | Huizinga et al. | 426/607 |
| 5,968,584 A | * 10/1999 | Cain et al. | 426/601 |
| 6,024,997 A | 2/2000 | Blaschke et al. | |
| RE36,785 E | 7/2000 | Colson et al. | |
| 6,103,292 A | * 8/2000 | Del Vecchio | 426/549 |
| 6,149,953 A | 11/2000 | Redding, Jr. | 426/98 |
| 6,149,960 A | 11/2000 | Book et al. | 426/551 |
| 6,171,636 B1 | * 1/2001 | Sassen et al. | 426/603 |
| 6,261,613 B1 | 7/2001 | Narayanaswamy et al. | |
| 6,475,548 B2 | * 11/2002 | Bons et al. | 426/603 |

* cited by examiner

DOUGH ESPECIALLY FOR BAKED GOODS AND METHOD FOR MAKING

CROSS-REFERENCE TO RELATED APPLICATION

This application is a continuation application of U.S. patent application Ser. No. 09/639,016, filed Aug. 15, 2000, now U.S. Pat. No. 6,551,640 which is incorporated herein by reference.

BACKGROUND OF THE INVENTION

The present invention relates to food products such as shelf-stable dough for baked goods wherein fat-bearing pieces, that are dispersible within the dough, resist softening by depression of melting point within the dough. The present invention also includes a method for making the dough capable of receiving fat-bearing pieces without their softening because of depression of the melting point of the fat-bearing pieces during storage of the dough with the fat-bearing pieces within the dough.

Cookies are among the best loved foods, as attested by a proliferation of cookie shops, as well as cookie aisles and cookie freezers in grocery stores. The cookies include baked cookies and refrigerated cookie dough. Dry mixes for the preparation of cookies, such as chocolate chip cookies, have also been available to consumers for many years.

One problem encountered in packaging and storing dry mixes has been the storage of chocolate chips used to make chocolate chip cookies. The chips have typically been stored apart from the dry mix. For instance, chocolate chips have been packaged in a separate pouch from the dry mix. The dry mix and chocolate chip pouch are packaged in a larger container and are not dispersed within the dry mix. Chips have been separately purchased and then admixed with the dry mix after addition of water to the dry mix.

For some embodiments, chocolate chips have been stored with a dry mix. The dry mix has had a low fat concentration, such as within a range of 3 to 4%. The dry mix also has had a low water concentration.

An addition of chocolate chips to cookie dough has been difficult to accomplish without sacrificing quality of a baked chocolate chip cookie. For instance, the Dartley et al. U.S. Pat. No. 4,894,246, which issued Jan. 16, 1990, describes a "halo effect" problem in baked chocolate chip cookies. The "halo effect" is a lightening in color of parts of a cookie adjacent the surfaces of the chocolate chips. The "halo effect" also occurs on the surface of the cookie in parts of the cookie where the chocolate chips are covered only by a thin crust. The Dartley et al. patent described a low melting fat, which was added to cookie dough, to reduce the "halo effect."

Another problem associated with addition of chocolate chips to cookie dough is "chip bleed." "Chip bleed" is a migration of material from the chip to the dough or to the crumb of the baked good. The Seiden et al U.S. Pat. No. 4,732,767, which issued Mar. 22, 1988, describes an addition of an emulsifier, which is predominantly crystalline at room temperature, to form a stable dough emulsion. The emulsifier ties up oil and syrup phases of a baked good made from the dough in a stable emulsion so the oil and syrup are less available to solubilize the chip components.

Problems such as "chip bleed" are even more vexing when a dough is stored for an extended period of time with chips in the dough. One other problem associated with addition of chocolate chips to a dough and extended storage of the dough, is the softening of chocolate chips when the chocolate chips are dispersed within the cookie dough. The softening is an increasingly greater problem the longer the dough is stored, especially when the dough is not stored at refrigeration temperatures, but at ambient temperatures.

Cocoa butter comprises about 27–28% by weight of a chip formula for conventional chocolate chips. Cocoa butter functions as an ingredient binder, a structural agent, a flavor carrier, and a textural and mouthfeel agent. Cocoa butter is a type of confectionery fat. Like other confectionery fats, cocoa butter has a reasonably hard consistency, stability, and a short melting range which is just below body temperature.

Cocoa butter is the primary fat source found in chocolate, and is defined as the edible fat obtained from cocoa beans. Cocoa butter exhibits a sharp melting point at 98° F. with a softening of the cocoa butter around 90° F. This melt profile of the cocoa butter provides the primary functional role of fat in chocolate, the "melt in the mouth" textural properties. Cocoa butter also contracts upon solidification which allows molding and shaping of chocolate without sticking to the molds.

The cocoa butter in a traditional chocolate chip serves several functions. First, it provides the sensory benefits of a creamy mouthfeel due to the fact that cocoa butter melts sharply at 98° F. The fat also carries flavor and allows this flavor to dwell on the taste buds, thereby enhancing the chocolate sensation. In addition to the sensory benefits of fat in chocolate, the fat serves several functional roles in the chocolate chip. The fat binds the cocoa and sugar together to form a paste. It provides the structure of the chip, and it lubricates and contracts to self-extract from molds. Lastly, the cocoa butter, in combination with sugar, provides a fragile but definite structure to the chip during baking so that the chip retains its shape in the oven.

Cookie products which are currently available are either baked, or if doughs, are frozen or are stored at refrigeration temperatures. Distribution of the products at frozen or refrigeration temperatures minimizes the softening degradation of the chocolate chips.

Developments in dough technology, such as shelf-stable doughs, have produced a problem with regard to degradation of chocolate chips when the chocolate chips are dispersed in the shelf-stable cookie dough. One problem with this dispersion is that after a relatively short period of time and at room temperature storage temperatures, the chocolate chips are transformed and softened from their solid state to a liquid state. The softening degradation is caused by interaction between the chocolate chip and constituents in the cookie dough. The principal interaction is between the cocoa butter in the chocolate chip and various fats in the cookie dough.

SUMMARY OF THE INVENTION

In its product aspect, one embodiment of the present invention resides in a ready-to-use dough article that provides a baked product such as a chocolate chip cookie. The dough article comprises a fat selected from a group consisting of one or more of a single fractionated fat, a double fractionated fat, cocoa butter or mixtures of a single fractionated fat, a double fractionated fat, and cocoa butter.

In one product aspect, the present invention resides in a dough that comprises a fat selected from a group consisting of one or more of a single fractionated fat, a double fractionated fat, cocoa butter or mixtures of a single fractionated fat, a double fractionated fat and cocoa butter and fat bearing particles that are dispersed within the dough.

In another product aspect, the present invention resides in a food article that comprises a dough and a container. The dough comprises a fat selected from the group consisting of single fractionated oil, double fractionated oil, and cocoa butter or mixtures of the single fractionated oil, double fractionated oil and cocoa butter.

In another product aspect, the present invention resides in a chocolate chip cookie dough. The chocolate chip cookie dough comprises margarine, and a fat selected from the group consisting of a single fractionated fat, a double fractionated fat, cocoa butter or mixtures of the single fractionated fat, the double fractionated fat or cocoa butter. The margarine is a carrier for the fat. The chocolate chip cookie dough also includes chocolate chips.

In another product aspect, the present invention resides in a baked chocolate chip cookie. In one cookie embodiment, the baked cookie is less friable than a conventional cookie.

In its method aspect, the present invention resides in a method for preventing fat bearing particles softening or melting in a dough. The method includes providing a dough comprising a single fractionated fat or a double fractionated fat or cocoa butter or a mixture of a single fractionated fat and a double fractionated fat and cocoa butter. Flavor chips or chocolate chips or other fat-bearing chips are added to the dough. The dough is added to a container for storage.

DETAILED DESCRIPTION

Figure 1:
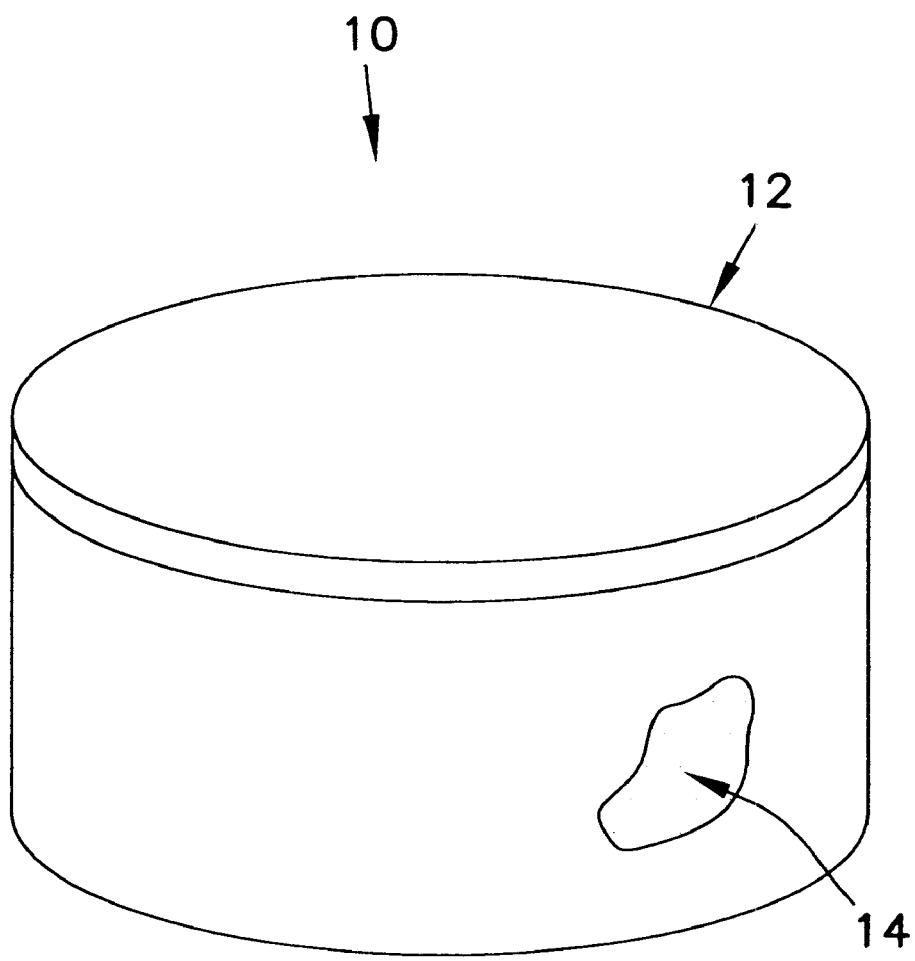
FIG. 1 is one perspective view of a container and dough of the present invention within the container.

In one product aspect, the present invention relates to ready-to-bake cookie doughs characterized by a capacity to receive chocolate chips or other fat-bearing chips without excessive softening or melting of the chips during storage at ambient temperatures, including temperatures as high as about 85° F. Each of the cookie dough components as well as attributes and methods of preparation are described in detail herein.

Throughout the specification and claims, percentages are by weight and temperatures are expressed in degrees Fahrenheit unless otherwise indicated.

One embodiment of the present invention comprises a cookie dough with a fat component wherein the fat component is provided by one or more of a single fractionated fat, a double fractionated fat, cocoa butter, or mixtures of these materials. Specific embodiments of the cookie dough include doughs with chocolate chips or other fat bearing particles in a concentration of at least about 1% to 35% by weight of the dough, dispersed within the dough. For some dough embodiments, the fat component is added to the cookie dough in a vehicle such as margarine. The fat component in the dough is present in a concentration of about 10 to 30%.

As used herein, the term "chocolate chip" refers to a particle having a cocoa butter concentration of about 27 to 28% by weight. Other ingredients in the chocolate chips include sugar and chocolate. Chocolate chips may be sweet or semi-sweet. One type of chocolate chip is low fat and has a fat concentration of about 24% and most typically about 27 to 28% by weight.

As used herein, the term "flavor chip" refers to a particle having a confectionery fat concentration of about 27 to 28% by weight. Flavor chips have flavors that include butterscotch, strawberry, banana, vanilla, orange, peanut butter, and other berry flavors.

As used herein, the term "fat bearing particle" refers to chocolate chips, flavor chips and other particles having a confectionery fat concentration of about 27 to 28% by weight.

The term, "single fractionated oils" as used herein, refers to melted fat that has been made by a process of controlled and limited crystallization. Single fractionated oils are oil fractions, separated from a fat substrate, that have different melting characteristics from each other. Fractionated oils generally have special physical properties that are usable as specialty fats or confectionery fats. In particular, the oils are substantially free of high melting point materials such as waxes. Single fractionated oil used in the present invention is triglyceride-based and has a melting point of about 97 to 99° F. Chocolate-compatible single fractionated oil has a free fatty acid content of no more than about 5% by weight. Chocolate-compatible single fractionated oil does not display a eutectic effect when exposed to chocolate. Single fractionated oils are derived from animal fat, milk fat, marine oils or vegetable oils.

The term, "double fractionated oil" as used herein, refers to a chocolate-compatible oil that yields a super olein with an iodine value of about 65. Double fractionated fat has a sharp melt point and improved mouthfeel due to the removal of fat melting fractions above body temperature. Double fractionated oils are derived from animal fat, milk fat, marine oils or vegetable oil.

The term, "confectionery fat" as used herein, refers to a chocolate-compatible fat with a reasonably hard consistency, stability, and a short melting range just below body temperature. Confectionery fats are solid at room temperature; have a desirable "snap"; and melt smoothly and rapidly in the mouth, giving a cooling effect with no greasy impression on the palate. Confectionery fats may be single fractionated or double fractionated.

The term, "emulsion" as used herein, refers to a heterogeneous system that includes one immiscible liquid dispersed in another one, in the form of droplets with a diameter generally over 0.1 microns. Margarine is a water in oil emulsion that, for the present invention, comprises about 60–80% fat and 40–20% water.

The term "dough" as used herein refers to an unbaked food product that has a low water concentration. Dough includes flour, which forms in a continuous dough medium into which other ingredients are embedded. A dough is typically prepared by beating, blending, cutting or kneading and is often stiff enough to cut into various shapes. A dough may be baked to make a chemically leavened product such as a quick bread or a yeast leavened product or a cookie.

The term "batter" as used herein refers to an unbaked food product that essentially contains flour, water and salt and optionally fat and sugar(s). Gluten development in a batter is minimized. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour.

The term "dry mix" as used herein refers to a particulate composition that is convertible to a batter or a dough with an addition of water or other high moisture ingredients such as milk, beer and/or eggs. In addition to water or other high moisture ingredients, fat containing components such as margarine or oil are typically added to a dry mix prior to baking.

In a conventional cookie dough system, fat used to prepare the dough is incompatible with cocoa butter in a chocolate chip. By "incompatible" is meant that fat in the dough softens and, under some circumstances, depresses the melting point of the fat in the chocolate chip when the fat in the dough contacts the chocolate chip. This depression of melting point results in softening of the chips and in extreme cases, can turn the chips from a solid at room temperature to a liquid.

Cocoa butter in the chocolate chip has a high solid fat content at room temperature, which steeply declines as the temperature is raised to just below human body temperature. The main characteristic of cocoa butter is the presence of a high content of symmetrical mono-unsaturated triglycerides. Cocoa butter has a saturated fat content, SFC, of 65 to 79 at 20° C.; an SFC of 57 to 76 at 25° C.; an SFC of 30 to 43 at 30° C.; and an SFC of zero at 35° C.

If the cookie dough is stored at room temperature, exchange of fatty acids occurs between the fat in the dough and the fat in the chips because of migration of fat in the dough to fat in the chips. When fat contact occurs, a fat exchange forms a blend of fats. The blend of fats displays eutectic effects, i.e. the melting point or solid fat content of the blend is lower than the weighted average of the individual components. Subsequently, the chocolate chips soften and lose their definition and negatively impact consumer acceptability. In particular, in a worst case, the chips turn into a small pool of liquid within the cookie dough.

A use of fat in the cookie dough which is both compatible and with the correct melt profile minimizes or eliminates the melting point depression associated with the fat migration. Within the confectionery industry, it is standard to quantify the melt profile as SFC, that is solid fat content. Another term describing melt profile is SFI, that is solid fat index. Each number, SFC or SFI is determined analytically by standardized methodology. Although both SFC and SFI refer to solids content at a given temperature, the values are not interchangeable. By raising the SFI or SFC of fat in the dough, the dough fat does not depress the melting point of fat in the chocolate. Chocolate chips maintain their integrity during storage in the dough. In order to achieve this stability, a fat used in the dough is selected that has a higher SFI or SFC than is conventionally used in dough.

Compatible fats include confectionery fats. Confectionery fats have a fatty acid composition and melting profile which makes them compatible with the cocoa butter in chocolate chips. The melting profile of confectionery fats is a very sharp melt just below body temperature with a relatively high solids concentration just below 98.6° F.

Furthermore, suitable confectionery fats do not display a polymorphism that is displayed by cocoa butter. Cocoa butter has different crystal structures, polymorphs, which can, under some temperature conditions, produce a bloom on the chocolate chip. A bloom is a grayish appearance on the chip.

Because of these attributes of the confectionery fat used to make dough, the process of the present invention produces a shelf-stable cookie dough of the present invention. The shelf-stable cookie dough comprises a chocolate chip component or other fat-bearing particle component and a dough component. The dough component includes the confectionery fat, which has been single fractionated or double fractionated.

The shelf-stable cookie dough of the present invention includes chocolate chips or flavor chips or a mixture of chocolate and flavor chips that are dispersed within the dough in a concentration of about 1% to 35% by weight of the dough. The cookie dough of the present invention is resistant to oil migration and does not display chocolate chip or fat-bearing chip softening at room temperature. While cookie dough is described herein, it is understood that other doughs such as brownie dough or batter, blondie dough or batter, aerated cake batter, scone dough or batter and biscuit dough or batter are suitable for use in the present invention. Furthermore, edible dough can be made in accordance with the method of the present invention.

Confectionery fat which can be a single fractionated oil or a double fractionated oil is added to the dough of the present invention to minimize or to inhibit migration of fat or to minimize or inhibit melting point depression of chips in the shelf-stable chocolate chip cookie dough. In one embodiment, margarine, which is an water in oil emulsion, is used as a vehicle to add confectionery fat to the chocolate chip cookie dough. However, this is not the only type of vehicle which may be used to introduce this fat into the dough. Margarines include compositions that are 60–80% fat and 20–40% water, although the ratio between the aqueous phase and the oil phase can vary. For longer storage requirements, a single or double fractionated oil in a margarine vehicle is employed to make dough.

Cookie dough products of the present invention that are prepared with the margarines comprise fractionated fats as a continuous oil phase. The fractionated fat embodiments include single fractionated fats and double fractionated fats. The presence of fractionated fats in the cookie dough produces substantial improvements in the stability of chocolate chips over extended storage at room temperatures.

Without the process and dough product embodiments of the present invention, it has been found that when chocolate chips are added to a shelf-stable cookie dough, the chocolate chips soften to a point where they can turn into little pools of liquid, even as early as three days of being in the dough when stored at ambient conditions. By preventing a melting point depression, this undesirable physical change is substantially prevented.

Some embodiments of shelf stable doughs include doughs that employ a capsule-based technology. With this shelf stable technology, leavening agents are separated from dough by a barrier. In one embodiment, the barrier melts at a temperature of about 51.7° C. This dough embodiment does not require heat pasteurization. The dough is maintained in a pH range of about 3.8 to 6.3 and a water activity range of about 0.65 to 0.85 during storage. In combination, these variables are effective in substantially retarding the growth of any undesirable microorganisms. The dough, for some embodiments, additionally includes a supplemental preservative such as potassium sorbate or calcium propionate to limit or assist in limiting microbial growth.

Other shelf stable doughs include brownie doughs and blondie doughs. Other doughs include edible doughs having a plasticity that causes the doughs to retain a molded shape. Furthermore, the edible doughs can be held and shaped by hand without the dough sticking to hands or fingers. The edible doughs are usable as an edible clay by children.

Specific dough ingredients are summarized as follows:

Flour

The present dough compositions without the fat-bearing pieces comprise from about 25% to about 45% of the dough as flour. Conventionally, flour is standardized to a moisture content of about 14%. Flours useful herein are of a conventional type and quality including cake flour, bread flour, and all-purpose flour. Wheat flours are preferred but other flours conventionally used in the preparation of baked goods are also employed in full or partial substitution for the wheat flour. Traditional cake flour used for layer cakes has about 8% or less protein by weight of the flour. Pastry flour ordinarily has a protein level of about 10%. Other flours such as bread flour generally have a higher protein level of about 11 to 13% by weight. One protein range for wheat flour used in the present invention is between about 9 to 10% by weight of the flour.

A general all-purpose flour is also usable. This type of all-purpose flour generally comprises a mixture of both hard and soft wheat flours, i.e. both high protein level and low protein level flours. Such flours are useful if the average protein content ranges from about 8 to 10% by weight.

While chlorinated flours are used herein, unchlorinated flours are also usable because chlorination is an expensive, though unnecessary flour processing step. Malted flours should not be used. Unmalted flours may be used provided the flours are derived from wheats with minimal sprout damage. Enzyme inactivated flours are also usable. In particular, flours that are free of alpha-amylase activity and have a very reduced lipase and peroxidase activity are usable.

Other flours such as brominated flour, bleached flour, whole flour and heat treated flour are also usable. Germ containing flour and germ free flour are usable in the products of the present invention.

Sugar

The dough compositions of the present invention also essentially comprise 0–45% sugar by weight. A range of 25 to 35% sugar is usable for many embodiments. A nutritive carbohydrate sweetener ingredient in a ratio of about 0 to 0.25 to 0.75 is also usable. Typically, sucrose is used in mixes for baked goods as the sugar ingredient, although up to about 35% of the sugar in the present invention food products is supplied by dextrose or other nutritive carbohydrate sweetening agents such as corn syrup solids. Commercially available milled sugar usually contains up to about 4% starch as an aid to maintaining its free-flowing properties.

Ordinary granulated sugars are satisfactory for use in the dry mix. These sugars include sucrose, dextrose, maltose, fructose, lactose, brown and invert sugars, alone or in combination. The preferred sugar is sucrose. For embodiments where dough is stored at room temperature, the dough is free of reducing sugars.

For cookie embodiments, the sugar employed is granulated crystalline sugar wherein the sugar crystals are within a size range of about 200 to 500 microns. For brownie or blondie embodiments, a finer sugar granulation is typically employed.

Fat

The dough of the present invention comprises about 10 to 30% edible fat. For many embodiments, the fat range is about 15 to 22%. The fat comprises for some embodiments, cocoa butter, confectionery fat that is a single fractionated fat, or a double fractionated fat or a combination of these fats in a margarine carrier. The margarine has a fat content that ranges from 60% to 80% by weight.

One fractionated coating usable in the dough of the present invention has the following SFC and SFI characteristics:

| Temperature ° F. | SFI | Temperature ° C. | SFC |
| --- | --- | --- | --- |
| 50 | 65 to 69 | 10 | 91.0 to 95.5 |
| 70 | 56 to 62 | 20 | 80.0 to 86.4 |
| 80 | 49 to 54 | 25 | 67.0 to 73.2 |
| 92 | 17 to 22 | 30 | 43.0 to 45.0 |
| 100 | 0 to 9 | 35 | 10.1 to 13.0 |

This SFI and SFC data is substantially greater at higher temperatures than conventional or multi-purpose shortening. Examples of SFI and SFC for conventional shortening are as follows:

| Temperature ° F. | SFI "butter-like" Shortening | SFI common Shortening |
| --- | --- | --- |
| 50 | 31.0 to 35.0 | 31 to 35 |
| 70 | 16.5 to 20.5 | 23.5 to 26.5 |
| 80 | 9.5 to 12.5 | 22 to 25 |
| 92 | 1.3 to 3.5 | 17 to 20 |
| 100 | 1.0 max | |
| 104 | | 11 to 13.5 |

Multi-purpose shortening has an SFC of about 25 to 33 at 20° C.; an SFC of about 11 to 19 at 30° C. and SFC of about 3 to 9 at 40° C.

Moisture

The doughs of the present invention have a total moisture content of about 5 to 15% by weight. The total moisture includes water provided with or associated with the various essential and optional ingredients. For example, total moisture includes the moisture associated with the margarine, flour, starch, flavorings such as cinnamon and especially liquid eggs. The total moisture is determined by a vacuum oven drying of the doughs herein. In certain preferred embodiments, no added water is employed to formulate the present doughs. Moisture is provided in the margarine, pasteurized liquid eggs, saturated sugar solution or sugar syrup and the residual moisture associated with the dry ingredients.

The particular selection of ingredients and concentrations are selected to provide doughs having a water activity that is less than 0.85. For some embodiments, the water activity has a preferable range of 0.77 to 0.80 with the low being 0.65. Selection of such water activity value is important in achieving a balance between microbial shelf stability and dough handling characteristics. Water activity can be reduced by using polyols such as glycerol and sorbitol; using little or no water to make the dough and by having salt or sugar in the dough.

The present doughs range in pH from about 5 to 8. In certain embodiments, the doughs herein can be essentially free of conventional activated leavening acids. The combination of a low oxygen gas in the head space and low water activity are sufficient to maintain shelf stability at room temperature.

If desired, the doughs further comprise about 1–8% of a humectant, preferably about 1–6%. Humectant addition is helpful in achieving the present essential water activity level and the microbial shelf stability at room temperature provided by the present food products. The humectant is any commonly employed humectant ingredient. Preferred humectants are selected from a group consisting of sorbitol, xylitol, manitol, glycerin, glycerol, propylene glycol and mixtures thereof.

In other embodiments, the food articles of the present invention comprise an anti-mycotic ingredient such as potassium sorbate in a concentration range of up to about 0.2%, calcium propionate in a concentration of up to about 0.4%, or parabens. While not needed to maintain shelf stability, addition of such anti-mycotic ingredients are desired from a food safety standpoint in case the physical integrity of the food product is compromised and oxygen leaks into the headspace. Calcium propionate concentration ranges from 0 to 0.4% while paraben concentration ranges from 0 to 0.1%.

The food product of the present invention is specifically described in terms of cookies. Cookie varieties suitable for use with the dough of the present invention include drop cookies, icebox cookies which are made from a reshaped, refrigerated dough, bar cookies such as brownies, cut-out or rolled cookies, pressed cookies, or wafer cookies. For some of these cookie embodiments, chocolate chips or flavor chips are correspondingly small to permit passage though a press or under a roll.

Some of the cookie dough products of the present invention do not require a conventional activated acid/soda chemical leavening system. For instance, some dough embodiments include chemical leavening agents that are encapsulated and dispersed within the dough. However, these encapsulated leavening agents are not activated until heated at the time of baking. Some dough embodiments include capsules that comprise sodium bicarbonate which has a coating of fat that melts during baking. The soda then reacts with leavening acids to leaven the product.

An optional ingredient includes nonfat dry milk solids. Nonfat dry milk solids aid the structuring of the finished baked good. If present, such dry milk solids comprise from about 0.5 to 2.0% of the present doughs.

Other optional ingredients include vitamin and mineral fortifications. These fortifications include calcium in a form of tricalcium phosphate or dicalcium phosphate and heat tolerant vitamins.

Some embodiments of the product of the present invention also include a container, dough stored within the container, the dough expanded with an inert gas, with a headspace over the dough and inert gas within the headspace. The inert gas comprises $N_2O$, $CO_2$, or $N_2$ or combinations of these gases. Residual oxygen content is less than 4% and for best results, is less than 2%. For some embodiments, the dough products of the present invention comprise $N_2O$ in the headspace. The $N_2O$ is partially dissolved in the dough and is in equilibrium with the inert gas in the headspace. An advantage is that the $N_2O$ functions as one of or even the sole leavening agent in the dough. Addition of $N_2O$ also to the headspace facilitates equilibrium between the headspace and the dough.

For some embodiments, the headspace comprises at least 10%, v/v of $CO_2$, and may be at least 20%. At such levels, the $CO_2$ provides modest preservative properties against spoilage.

Method of Preparation

The doughs of the present invention are prepared by blending the essential and optional components, such as flour, salt, sugar, margarine, fat, glycerol or other polyol together in such a conventional manner as to produce a well blended dough having densities ranging form about 0.7 to 1.1 g/cc. The dough is prepared by blending the fat or margarine with the sugar followed by the addition of eggs and other wet ingredients. The dry ingredients are then added, followed by the chocolate chips to the well mixed dough. The dry blend includes flour, sugar, salt and so on. The dough can be mixed under anaerobic conditions to form a dough. The dough can, for example, be prepared in a batch or a continuous mixing device adapted to add gas such as nitrogen to the dough.

For some embodiments, the $N_2O$ is admixed with the dough to form a low-density dough in any convenient manner. For example, the admixture step, for some embodiments, is practiced using a twin screw extruder equipped with a gas injection mechanism. The dry ingredients and wet ingredients are added to the twin screw extruder to form a dough. At a later stage of the extruder, $N_2O$ gas is injected and mixed in the extruder with the dough to incorporate sufficient amounts of $N_2O$ to form the low density $N_2O$ containing dough. An advantage of using a twin screw extruder is that a single piece of equipment is used to prepare the dough and to incorporate the $N_2O$ to form the low-density dough.

Another embodiment comprises preparing a high density dough, e.g. about 1.1 g/cc to about 1.4 g/cc, preferably 1.1 to 1.25 g/cc, using conventional dough preparation mixers and techniques. Thereafter, in a separate substep or piece of equipment, $N_2O$ is admixed with the high-density dough to form the present low-density dough, 0.7 to 1.2 g/cc. For example, one well-known "Mondomix" mixer is used to emulsify and aerate gas, liquid and solid mixtures. The Mondomix mixer is manufactured by Mondomix B. V. of ZH Nederhorst den Berg I, The Netherlands. The Mondomix mixer comprises a stainless steel mixing head which operates from 200 to 2000 rpm. The mixer comprises 150 square stainless steel pins distributed in an intermeshing array between a rotor and a stator. These elements are positioned within a mixing chamber with an effective volume of 300 ml. The mixing chamber is double jacketed to control product temperature when mechanical energy is introduced to emulsify and aerate product streams.

One other mixer, a well-known "Goodway" mixer is often used in the aerated confection industry to aerate confection slurry to form aerated foam. The CM-6 continuous mixer/foamer manufactured by Goodway Sales, Inc., 175 Orville Drive, Bohemia, N.Y., comprises a mixing chamber fed by a positive displacement pump and air flow system. Product flow is controlled by flowmeter adjustment. Variable speed motors with ten turn controls power the mixer and pump drives. Stainless steel concentric rows of intermeshing teeth on two stators and one rotor produce a uniformity and consistency in the mix.

The high density dough is fed to the Mondomix mixer or the Goodway mixer. A $N_2O$ supply feeds the mixer. After incorporation, a low density $N_2O$ containing dough is formed. Other well-known apparatus and techniques, whippers or aerators are usable to practice the $N_2O$ incorporation into the dough step, e.g. an "Oakes" whipper.

The incorporation of $N_2O$ herein is distinguishable from merely flushing $O_2$ with $N_2O$ as known in the art, even when several flushing cycles are practiced. Such mere flushing of $O_2$ with $N_2O$ does not result in a low-density dough as in the present invention.

Desired quantities of the $N_2O$ containing doughs are then charged or are otherwise disposed within the container to partially fill the container. For other dough embodiments that are not charged, the dough is also disposed within the container. The container is then flushed with an inert gas to remove residual air and to insure low oxygen in the headspace. Oxygen is equal to or less than 4% by volume and is preferably less than 2%. The container is then sealed to form the finished ready-to-bake container articles. The articles have an extended shelf stability at room temperature and do not require refrigerated storage.

The temperature of dough during the filling step can be at room temperature, or slightly higher, e.g. about 60° F. to 100° F. (21.1° C. to). The packaged ready-to-bake bake dough articles herein do not require heat treatment such as pasteurization or refrigeration in order to obtain shelf stability notwithstanding having a relatively high pH. The products enjoy microbial stability and retain their good baking properties for as long as four to nine months at room temperature storage. The articles are packaged to be substantially unpressurized, i.e. can be packaged at atmospheric pressure.

The present doughs are conveniently prepared into finished baked goods by simple addition to a suitable baking container or pan and baking to form a finished baked good which is charged into a baking container and baked for sufficient times, for example, at 160 to 218.3° C. (325 to 425° F.) for about 10 to 40 minutes to form a finished baked good.

Baking time depends upon the thickness of the dough in the pan, with a longer bake time required for a thicker dough. Bake times range between about 10 to 45 minutes. The resultant finished baked goods are characterized by a texture that ranges from crisp, soft, chewy or spread, depending upon the ratio of ingredients in the dough, the baking temperature and the pan coating. The finished baked goods are further characterized by being expanded or leavened and typically have densities ranging from about 0.3 to 0.7 g/cc. The finished baked goods are ready for immediate consumption or can be prepared on a commercial scale for distribution.

EXAMPLE 1

One shelf stable chocolate chip cookie dough prepared with leavening capsules was made as follows:

| Ingredient | % by Weight |
| --- | --- |
| Flour | 25.0 |
| Chocolate chips | 24.0 |
| Leavening capsules | 0.5 |
| Single Fractionated Fat in | |
| Margarine | 15.0 |
| Sugar | 25.0 |
| White egg | 8.0 |

The dough was prepared by blending ingredients such as wheat flour, sweetening agents, margarine, leavening agents, salt and so on with liquid ingredients such as eggs and so on. The fat was a single or double fractionated oil having a melting point of about 95–99F. The fat was made into a margarine carrier. The margarine had a water concentration of about 30% by weight of the margarine.

Encapsulated sodium bicarbonate was added to the dough. In one embodiment, chocolate chips were added to the dough. The dough was transferred to a container which was not subject to pressurization and which was storable for at least about 6–8 months.

The dough was packaged in either cardboard cans or plastic jugs or tubs or flexible packaging such as plastic pouches or other convenient packaging material. The dough was preformed in a baking tray specific to the desired type of final baked product.

The dough was prepared without aseptic techniques or without heat pasteurization. The flour was subject to a sterilization procedure such as dry sterilization, infrared heating, microwave heating, or irradiation or any other process suitable for decreasing microbial load on the dry materials.

EXAMPLE 2

A dough was prepared that did not include a margarine component. The dough was prepared from the following ingredients:

| INGREDIENT NAME | Base % | % w/Chips | Weight |
| --- | --- | --- | --- |
| Fat | 17.50% | 13.65% | 8.19 |
| EFG | 14.41% | 11.24% | 6.74 |
| Liquid Sugar | 22.73% | 17.729% | 10.64 |
| Whole Eggs | 6.63% | 5.171% | 3.10 |
| Med. Brown Sugar Molasses | 1.56% | 1.217% | 0.73 |
| Potassium Sorbate | 0.13% | 0.101% | 0.06 |
| Subtotal | 8.32% | 6.49% | 3.89 |
| Flour, unmalted | 34.985% | 27.288% | 16.37 |
| Encapsulated Soda @ 50% | 0.900% | 0.702% | 0.42 |
| Vanilla, dry | 0.335% | 0.261% | 0.16 |
| Salt | 0.670% | 0.523% | 0.31 |
| Citric Acid | 0.050% | 0.039% | 0.02 |
| Sodium Citrate | 0.100% | 0.078% | 0.05 |
| Subtotal | 37.040% | 28.891% | 17.335 |
| Chocolate chips | 0.000% | 22.000% | 13.20 |
| TOTAL | 100.000% | 100.000% | 60.00 |
| INDICATOR | RATIO in cookie | In Base | w/Chips |
| Flour | 35.68% | 34.99% | 27.29% |
| Total Sugar | 33.53% | 15.97% | 12.46% |
| Sugar/Flour ratio | 0.94% | 45.6% | 45.6% |
| Fat (Base Only) | 18.03% | 12.98% | 10.12% |
| Moisture | 9.50% | 10.18% | 7.94% |

EXAMPLE 3

A dough was prepared that included about 30–32% sugar, flour, vanilla, salt, soda and about 4–7% by weight liquid eggs. Double fractionated oil was added to a concentration of about 80% by weight in a margarine carrier. The margarine carrier had a fat concentration of about 80% and a water concentration of about 20% by weight.

This dough was usable as an edible dough or as a bakable dough product. The bakable dough product, when baked, made cookies.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. An edible dough product, comprising an edible dough free from particles, comprising a fat selected from a group consisting of one or more of a single fractionated fat, a double fractionated fat, cocoa butter or mixtures of a single fractionated fat, a double fractionated fat and cocoa butter wherein the fat selected has an SFI falling within one or more of the following ranges:
about 65 to 69 at 50 F;
about 56 to 62 at 70 F;
about 49 to 54 at 80 F;
about 17 to 22 at 92 F;
about 91 to 96 at 10 C;
about 80 to 87 at 20 C;
about 67 to 74 at 25 C;
about 43 to 45 at 30 C; and
about 10 to 13 at 35 C.

2. The dough product of claim 1 and further comprising fat bearing particles, that are dispersed in the edible dough.

3. The dough of claim 2 wherein the fat bearing particles are chocolate chips and are present in a concentration of about 1 to 35% by weight.

4. The dough of claim 1 wherein the fat has a concentration of 10 to 30 percent by weight.

5. The dough of claim 1 and further comprising an encapsulated leavening agent.

6. The dough of claim 1 wherein the dough has a water activity of not more than about 0.85.

7. The dough of claim 1 and further comprising flavor chips that are dispersed within the dough.

8. The dough of claim 1 and further comprising margarine wherein the fat is blended into the margarine.

9. The dough of claim 8 wherein the margarine has a water concentration of about 20 to 40 percent.

10. A food article, comprising:
a dough comprising a fat selected from the group consisting of single fractionated oil double fractionated oil and cocoa butter or mixtures of the single fractionated oil, a double fractionated oil and cocoa butter wherein the fat selected has an SFI falling within one or more of the following ranges:
about 65 to 69 at 50 F;
about 56 to 62 at 70 F;
about 49 to 54 at 80 F;
about 17 to 22 at 92 F;
about 91 to 96 at 10 C;
about 80 to 87 at 20 C;
about 67 to 74 at 25 C;
about 43 to 45 at 30 C; and
about 10 to 13 at 35 C; and
a container for enclosing and storing the dough.

11. The food article of claim 10 wherein the container defines surfaces for receiving cookie dough.

12. The food article of claim 10 wherein the dough is cookie dough.

13. The food article of claim 10 wherein the dough is a brownie dough.

14. The food article of claim 10 wherein the dough is a blondie dough.

15. The food article of claim 10 wherein the dough is an edible dough.

16. The food article of claim 10 wherein the dough is an aerated cake dough.

17. The food article of claim 10 wherein the dough is a scone dough.

18. The food article of claim 10 wherein the dough is a biscuit dough.

19. The food article of claim 10 wherein the dough further comprises fat-bearing particles.

20. The food article of claim 10 wherein the dough further comprises chocolate chips.

21. The food article of claim 10 wherein the container comprises a vent.

22. A chocolate chip cookie dough, comprising:
margarine;
a fat selected from the group consisting of a single fractionated fat, a double fractionated fat, cocoa butter or mixtures of the single fractionated fat, the double fractionated fat or cocoa butter wherein the fat selected has an SFI falling within one or more of the following ranges:
about 65 to 69 at 50 F;
about 56 to 62 at 70 F;
about 49 to 54 at 80 F;
about 17 to 22 at 92 F;
about 91 to 96 at 10 C;
about 80 to 87 at 20 C;
about 67 to 74 at 25 C;
about 43 to 45 at 30 C; and
about 10 to 13 at 35 C,
wherein the margarine is a carrier for the fat; and
chocolate chips.

23. The chocolate chip cookie dough of claim 22 wherein the cookie dough has a water activity of not more than about 0.85.

24. The chocolate chip cookie dough of claim 22 and further comprising an inert gas dispersed within the dough.

25. The chocolate chip cookie dough of claim 22 and further comprising encapsulated leavening agents dispersed in the dough.

* * * * *

UNITED STATES PATENT AND TRADEMARK OFFICE
CERTIFICATE OF CORRECTION

PATENT NO. : 6,592,925 B2
DATED : July 15, 2003
INVENTOR(S) : Drantch et al.

It is certified that error appears in the above-identified patent and that said Letters Patent is hereby corrected as shown below:

Title page,
Item [56], References Cited, U. S. PATENT DOCUMENTS,
below, reference "6,475,548" insert -- 4,235,618    11/1980    Henry et al. --.

Signed and Sealed this

Eleventh Day of May, 2004

JON W. DUDAS
*Acting Director of the United States Patent and Trademark Office*